United States Patent [19]
Yu

[11] Patent Number: 5,235,493
[45] Date of Patent: Aug. 10, 1993

[54] ALTERNATELY HORIZONTAL OR VERTICAL COMPUTER MAIN FRAME HOUSING

[75] Inventor: Chien-Chun Yu, Taipei, Taiwan

[73] Assignee: Sinotek International Co., Ltd., Taipei, Taiwan

[21] Appl. No.: 883,782

[22] Filed: May 15, 1992

[51] Int. Cl.[5] .................. H05K 5/02; A47B 81/00; A47B 47/00
[52] U.S. Cl. .................. 361/685; 361/724; 361/725; 312/223.2; 312/265.5
[58] Field of Search .............. 312/109, 223.2, 257.1, 312/263, 265.5, 265.6; 364/708; 361/390, 380, 391, 392, 393, 394, 395, 399, 415

[56] References Cited

U.S. PATENT DOCUMENTS

| | | | |
|---|---|---|---|
| 5,031,070 | 7/1991 | Hsu | 361/380 |
| 5,121,296 | 6/1992 | Hsu | 361/395 |
| 5,124,885 | 6/1992 | Liu | 361/391 |
| 5,138,525 | 8/1992 | Rodriguez | 361/390 |

*Primary Examiner*—Leo P. Picard
*Assistant Examiner*—Michael W. Phillips
*Attorney, Agent, or Firm*—Jacobson, Price, Holman & Stern

[57] ABSTRACT

A computer mainframe housing, of which the main materials are made in flat shapes from steel sheets with plastic directly molded thereon through the process of injection molding, including a back panel, two identical cover panels with one for the top and the other for the bottom, two identical side panels with one for the left and the other for the right, a partition board, a plurality of master board mounting plates, a main disk drive case, an auxiliary disk drive case, a front panel connected with other parts by retaining devices thereon, the front panel having a square window with a square control panel detachably mounted thereon, the main disk drive case having a square front face, the hole into which the main disk drive case is inserted, being made in the shape of a square, wherein the steel sheets of the materials provide good shielding effect against magnetic waves; the front, back, side, and cover panels can be piled up together to reduce space occupation before assembly; retaining devices are directly molded on the parts for easy and quick assembly; by changing the positions of the control panel and the main disk drive case, the computer mainframe housing can be alternatively arranged into a horizontal or vertical form.

5 Claims, 7 Drawing Sheets

ALTERNATELY HORIZONTAL OR VERTICAL COMPUTER MAIN FRAME HOUSING

BACKGROUND OF THE INVENTION

1. Field of the Invention

The present invention relates to computer mainframe housings, and more particularly, the present invention relates to a personal computer mainframe housing which includes various flat panels and a front panel, and which can be conveniently alternatively arranged into a horizontal or vertical configuration.

2. Description of the Prior Art

According to conventional structures, the mainframe housing of a personal computer is generally comprised of a substantially U-shaped top cover plate covering a substantially U-shaped bottom plate, a front panel, and other parts. The top cover plate and the bottom plate are not interchangeable and are made separately. Because the parts are not interchangeable, their manufacturing cost is relatively expensive. When assembled, a mainframe housing is fixed for horizontal or vertical operation according to its original design. For forming a horizontal computer mainframe housing, the parts of a vertical computer mainframe housing are useless. Still another disadvantage of the conventional structures of computer maninframe housings is that they are difficult to assemble and disassemble because they use screws to fasten parts together.

SUMMARY OF THE INVENTION

The present invention eliminates the disadvantages of prior art computer mainframe housings. According to the present invention, a computer mainframe housing, of which the main materials are made in flat shapes from steel sheets with plastics directly molded thereon through the process of injection molding, comprises a back panel, two identical cover panels with one for the top and the other for the bottom, two identical side panels with one for the left and the other for the right, a partition board a plurality of master board mounting plates, a main disk drive case, an auxiliary disk drive case, a front panel connected with other parts by retaining devices thereon, wherein the front panel has a square window with a square control panel detachably mounted thereon; the main disk drive case has a square front face, and the hole into which the main disk drive case is inserted is also made in the shape of a square.

According to one aspect of the present invention, the major parts of the computer mainframe housing are made from steel sheets with plastic retaining devices directly molded on the peripheral edges thereof for quick connection with one another, and for easy storing with less space occuption before assembly, wherein by changing the positions of the control panel and the main disk drive case, the computer mainframe housing is alternatively arranged into a horizontal or vertical form.

According to another aspect of the present invention, the back panel is made from a steel sheet with a plurality of plastic sliding channels directly vertically molded above a plurality of expansion slots thereof, which sliding channels each have a retaining hole at the center and are each fastened with a resilient retaining element to hold an interface card.

According to still another aspect of the present invention, the master board mounting plates are made from a plastic material through the process of injection molding, each have a plurality of substantially cross-shaped fastening holes, which cross-shaped fastening holes each have an elongated through hole vertically through each mounting plate and an elongated groove transversely disposed on a bottom edge thereof and are each inserted with a fastening device to hold down a master board, which fastening device includes an arrow-shaped plug pin, a spring and a washer.

According to still another aspect of the present invention, the main disk drive case comprises a plurality of rows of small round holes on two opposite side walls thereof corresponding to a plurality of rows of bolt holes on the disk drive to be fastened, a plurality of rows of holes respectively disposed adjacent to said rows of small round holes by one side, and a plurality of rows of pairs of raised portions alternatively respectively arranged in line with the rows of small round holes, wherein each pair of raised portions include one raised portion formed above either small round hole and the other raised portion formed therebelow; the small round holes are each fastened with a fastening device to hold the disk drive in place.

BRIEF DESCRIPTION OF THE DRAWINGS

FIG. 4A is an enlarged sectional view of the area encircled by line 4A—4A;

DETAILED DESCRIPTION OF THE PREFERRED EMBODIMENTS

Figure 1:
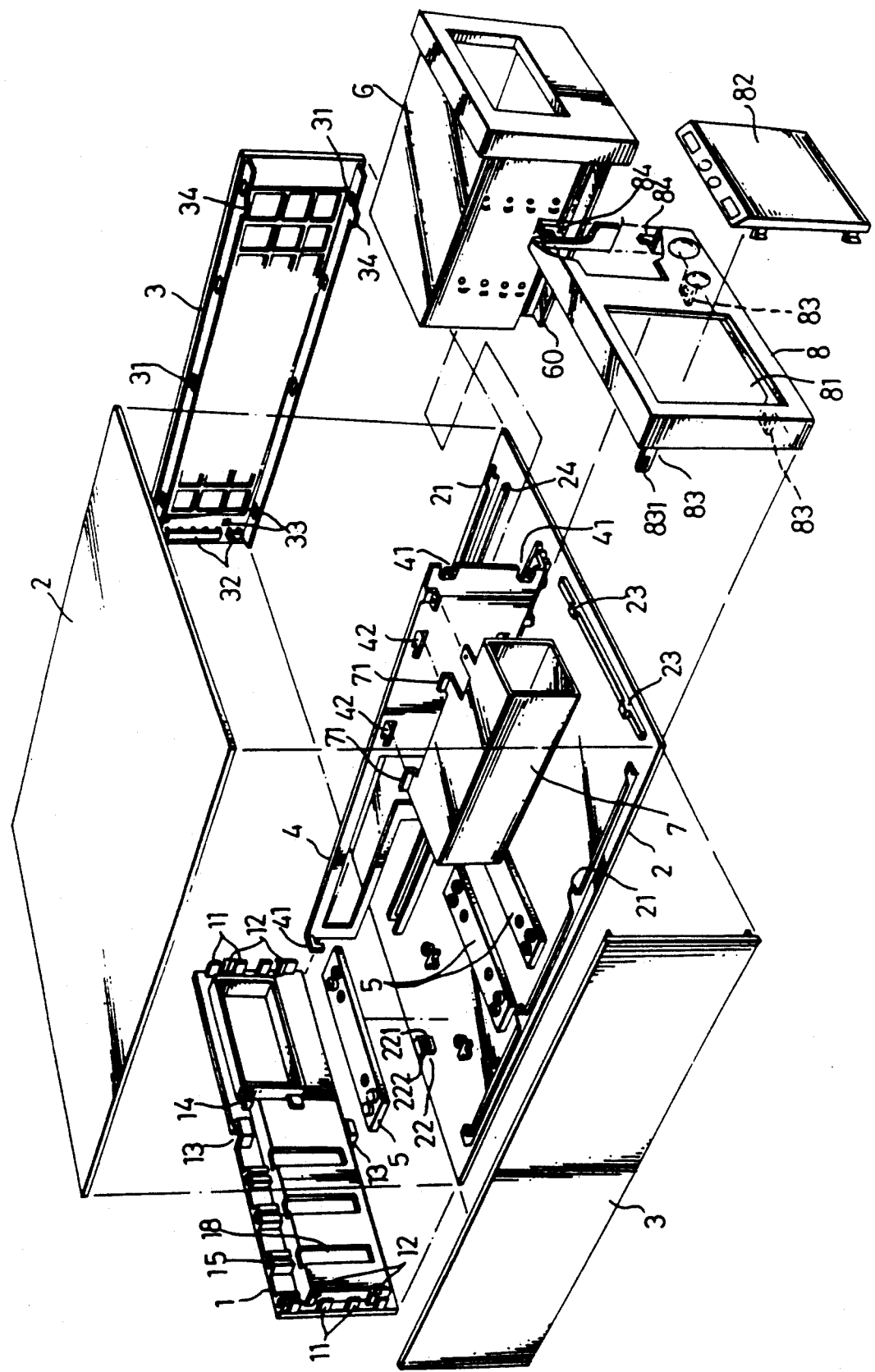
FIG. 1 is an exploded view of a computer mainframe housing according to the present invention.

Referring to FIG. 1 a computer mainframe housing according to the present invention is comprised of a back panel 1, two identical cover panels 2 (one for the top, the other for the bottom), two identical side panels 3, a division board 4, a plurality of master board mounting plates 5, a main disk drive case 6, an auxiliary disk drive case 7, and a front panel 8. The front panel 8 has a window 81, into which a control panel 82 fits. The front face of the main disk drive case 6 as well as the opening into which the main disk drive case 6 fits, are respectively made in the shape of a square.

Figure 2:
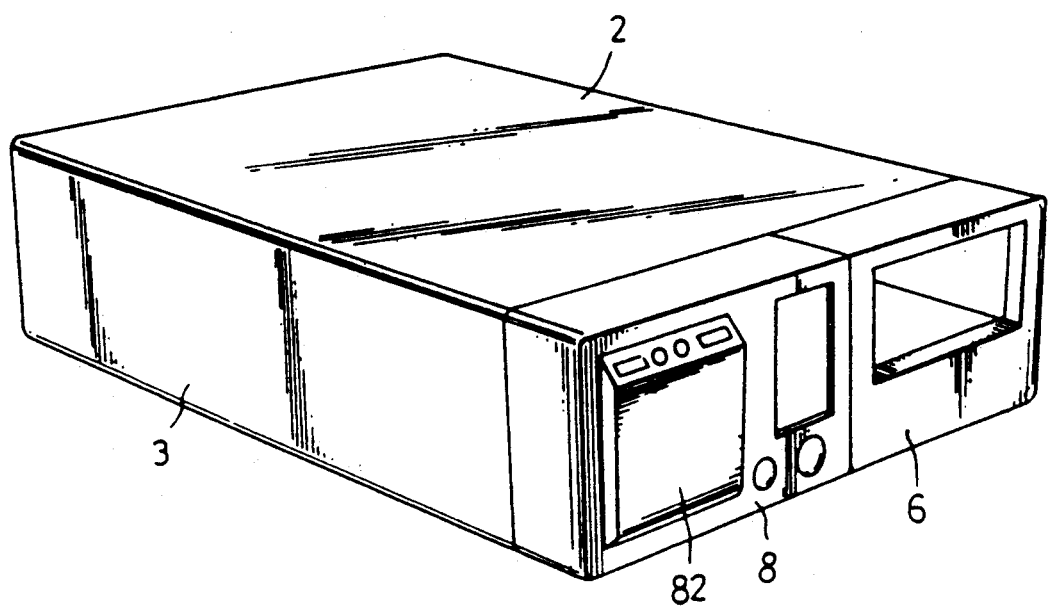
FIG. 2 illustrates the present invention arranged as a horizontal computer mainframe housing.
Figure 3:
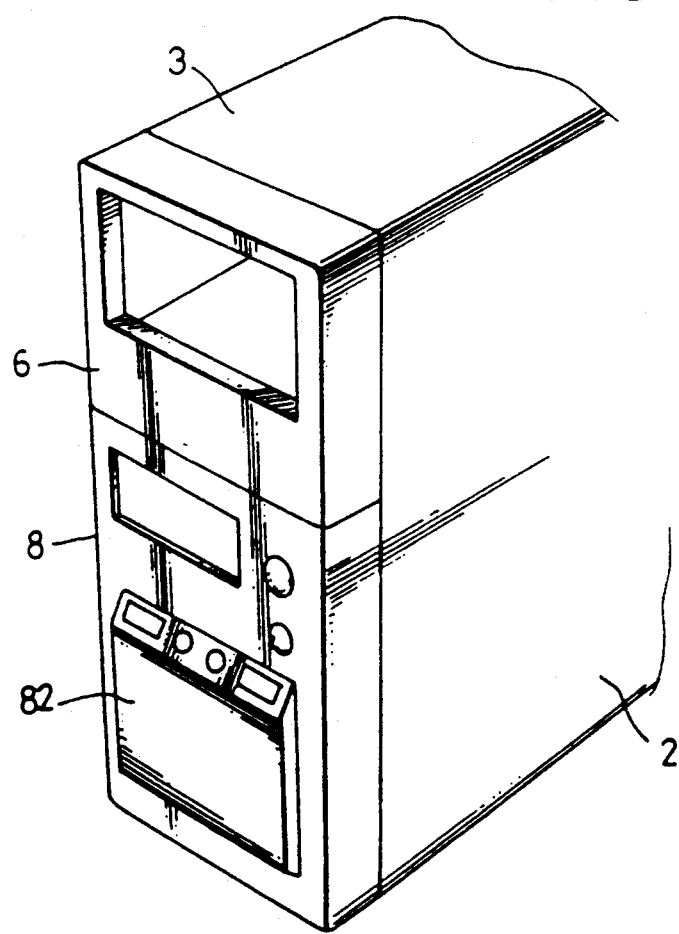
FIG. 3 illustrates the present invention arranged as a vertical computer mainframe housing.

The aforesaid parts are respectively made from steel sheets having each a plurality of retaining devices directly molded on the peripheral edges thereof through the process of injection molding, for connecting to one another. Because the top and bottom cover panels are identical, the left and right side panels are identical, the cost of the molds for manufacturing those components can be greatly reduced. Further, the same set of parts can be alternatively arranged into a horizontal computer mainframe housing (as FIG. 2) or vertical computer mainframe housing as (FIG. 3). Because the major parts of the present invention are made as flat plates, they can be piled to reduce space during delivery or when stored.

Figure 4:
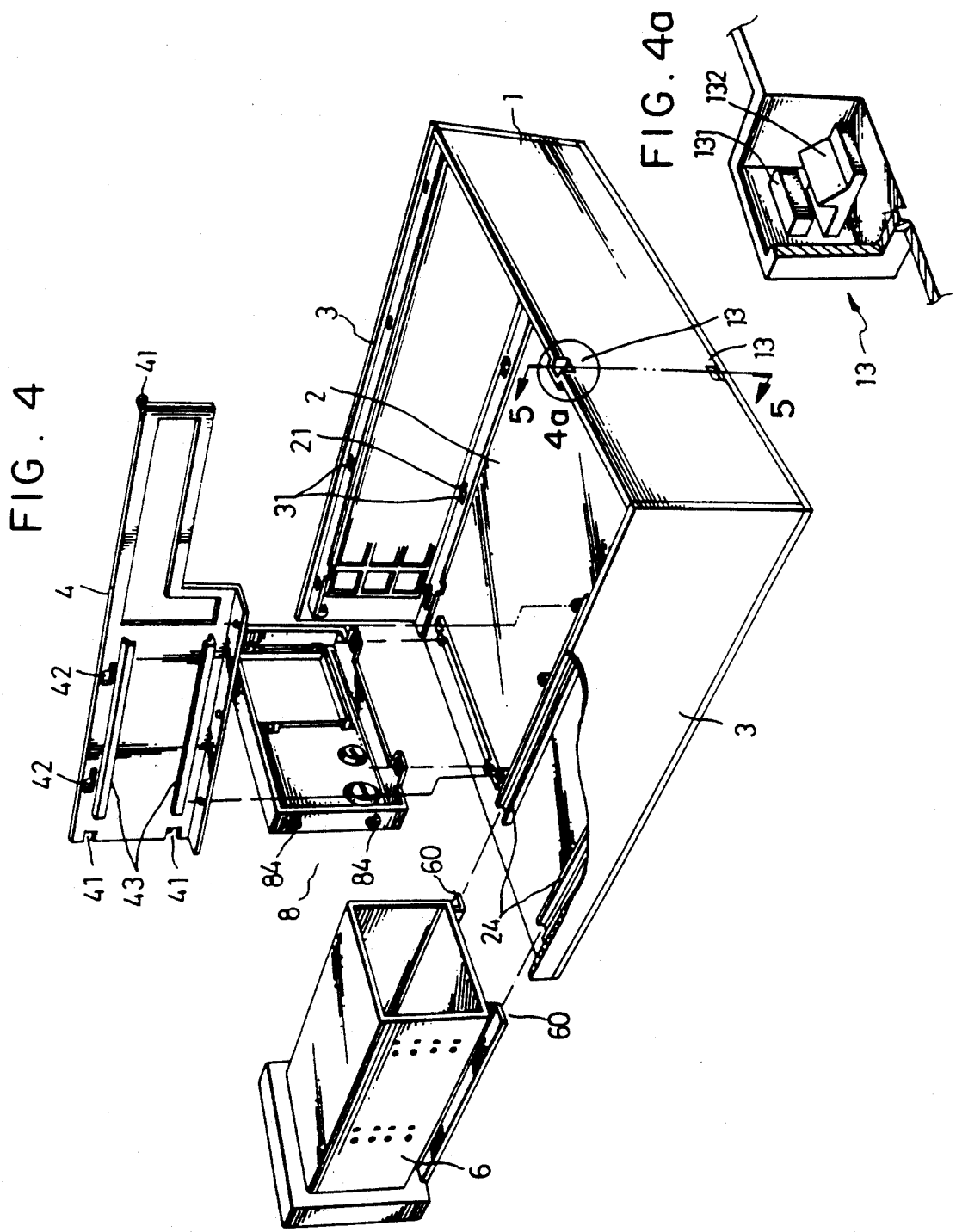
FIG. 4 is a partially assembled and partially exploded view showing the procedure of connecting the back panel, the front panel, the main disk drive case, the cover panels and the partition board together.
Figure 5:
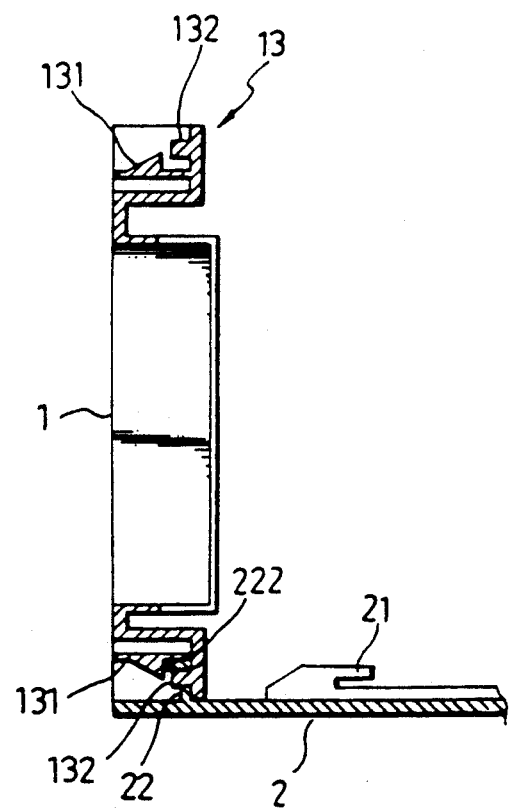
FIG. 5 is a sectional view showing the connection of the cover panel with the back panel.

The retaining devices on the aforesaid parts may be variously embodied. FIGS. 1 and 4 illustrate an example for the purpose of illustration only. As illustrated in FIGS. 1 and 4, the cover panels 2 have each two rows of forward hooked portions 21 at two opposite sides; the side panels 3 each have two rows of elongated holes 31 at two opposite sides. By hooking the hooked portions 21 into the elongated holes 31, the two cover panels 2 are respectively connected to the two side panels 3, forming a flat box. By detaching the hooked portions 21 from the elongated holes 31, the cover panels 2 and the side panels 3 are conveniently quickly dismantled. The side panels 3 each have a plurality of plug holes 32 along the rear end thereof and two opposite retainer blocks 33 near the plug holes 32; the back panel 1 has a plurality of plug strips 11 and resilient retaining elements 12 at two opposite ends corresponding to the plug holes 32 and the retainer blocks 33 on the side panels 3. By inserting the plug strips 11 into the plug holes 32 permitting the retainer blocks 33 to be respectively retained by the resilient retaining elements 12, the side panels 3 and the back panel 1 are conveniently quickly connected together. By releasing the resilient retaining elements 12 from the retainer blocks 33, the back panel 1 can be conveniently quickly disconnected from the side panels 3. The back panel 1 has two opposite retaining devices 13 at the middle of which each is consisted of, as shown in FIG. 4A, a resilient retaining block 131 and a hook 132; the cover panels 2 have each a L-shaped projecting block 22 near the rear edge thereof at the middle, which has a hole 221. By hooking the hook 132 in the hole 221 on the projecting block 22 permitting the resilient retaining block 131 to stop at the top edge 222 of the projecting block 33, the cover panels 2 and the back panel 1 are conveniently quickly connected together. On the contrary, removing the resilient retaining block 131 from the projecting block causes the cover panels 2 to be conveniently disconnected from the back panel 1.

When assembled into a configuration as shown in FIG. 4, the front panel 8 and the partition board 4 can then be connected. The front panel 8 has resilient retaining plates 83 extended from the left side edge and the bottom side edge thereof, of which each has a rectangular hole 831 as shown in FIG. 1. By fastening the resilient retaining plates 83 on two corresponding projecting blocks 34 on the left-hand side panel 3, the front panel 8 is quickly connected to the left-hand side panel 3. The partition board 4 has two hooks 41 on the front end thereof and a hook 41 on the rear end thereof respectively hooked up with two opposite hooks 84 on the front panel 8 and a hook 14 on the back panel 1, and therefore the partition board 4 is connected between the front panel 8 and the back panel 1.

The auxiliary disk drive case 7 has two opposite pairs of angle strips 71 on the right; the partition board 4 has four retaining holes 42 at locations corresponding to the angle strips 71. By hooking the angle strips 71 in the retaining holes 42, the auxiliary disk drive case 7 is fastened to the partition board 4. After the cover panels 2, the side panels 3, the back panel 1, the front panel 8, the partition board 4 and the auxiliary disk drive case 7 have been connected, a square hole is left by one side of the front panel 8, into which the main disk drive case 6 can be inserted.

Referring to FIG. 4 again, the cover panels 2 and the partition board 4 each have a pair of guide tracks 24 and 43, respectively, for slidably receiving the main disk drive holder 6. The main disk drive case 6 has a pair of angle bars 60. By inserting the angle bars 60 into the guide tracks 24 on the bottom cover panel 2 or the guide tracks 43 on the partition board 4, the main disk drive case 6 is fastened into a horizontal or vertical operation position. The control panel 82 is mounted on the window 81 in direction according to the main disk drive case 6, so that the computer mainframe housing can be alternatively arranged into the horizontal form as shown in FIG. 2, or the vertical form as shown in FIG. 3.

Figure 6:
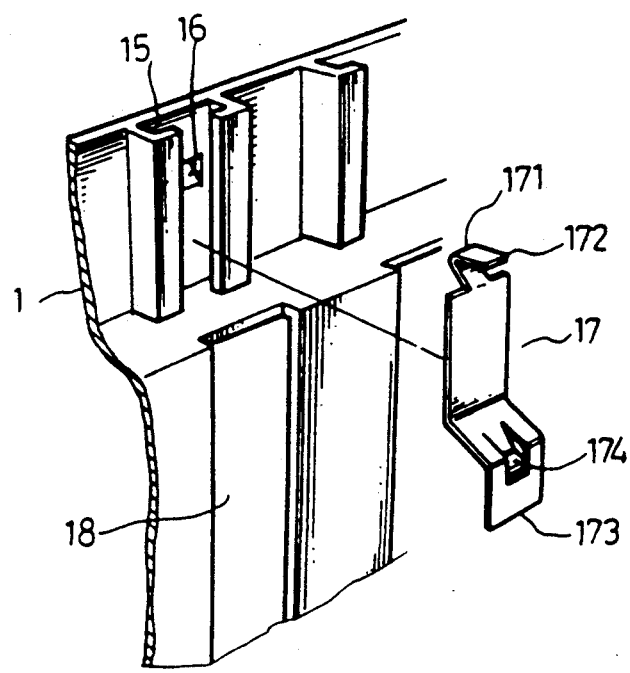
FIG. 6 is a partly exploded view showing the positioning and structure of the sliding channels and the resilient retaining elements.
Figure 7:
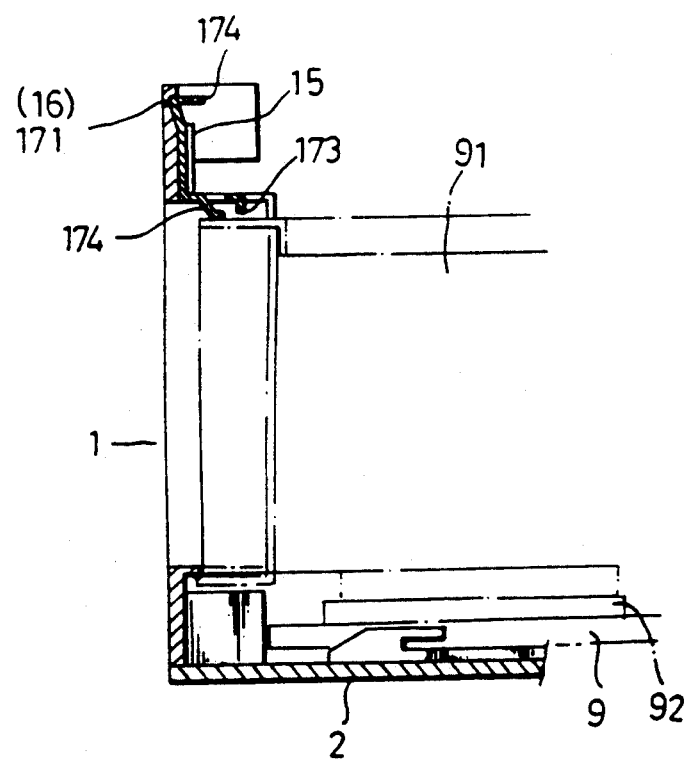
FIG. 7 is a sectional view showing that an interface card has been held in place by a resilient retaining element.

Referring to FIGS. 6 and 7 and seeing FIG. 1 again, the back panel 1 is made from a steel sheet with a plurality of vertical sliding channels 15 directly molded above the expansion slots 18. Each channel 15 has a retaining hole 16 at its middle. A resilient retaining element 17 is used to hold an interface card 91 (see FIGS. 6 and 7) in an expansion slot. The resilient retaining element 17 has a top end formed into a backward projection 171 terminating in a forward pull rod 172. A bottom end is bent forward at a right angle and then bent downward at a right angle, forming a pressure leg 173, which has a stop plate 174 obliquely extending downwardly from the back thereof through a 45° angle. When an interface card 91 has been inserted through either expansion slot 18 into an interface connector 92 on the master board 9, the resilient retaining element 17 is inserted in the corresponding sliding channel 15 with the backward projection 171 engaged into the retaining hole 16, permitting the interface card 91 to be retained in place by the pressure leg 173 and the stop plate 174. By pulling the pull rod 172 outward to remove the backward projection 171 out of the retaining hole 16, the resilient retaining element 17 is disconnected from the back panel 1, and therefore the interface card 91 can be conveniently removed from the computer mainframe housing. By means of the aforesaid arrangement, no screw means is required to fasten an interface card in place.

Figure 8:
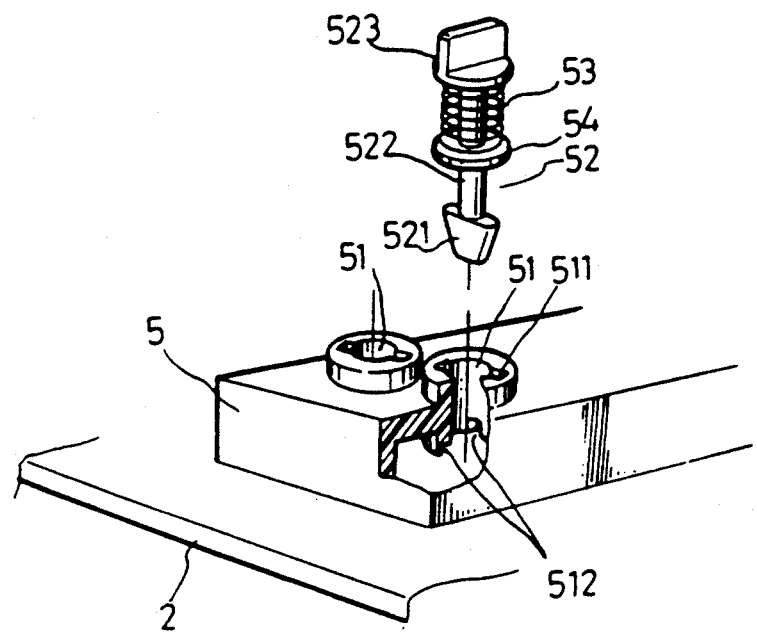
FIG. 8 is a partly out-off and exploded view showing the structure of the master board mounting plate and the fastening device.
Figure 9:
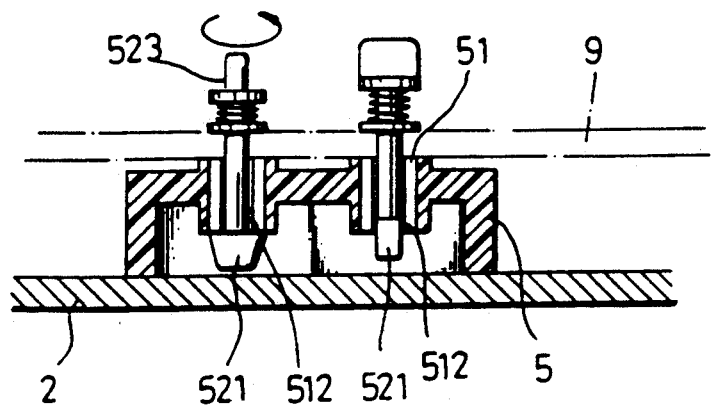
FIG. 9 is a sectional view showing that rotating the fastening device causes the master board to be locked in place.

Referring to FIGS. 8 and 9, the master board mounting plates 5 are made from a plastic material through the process of injection molding with each plate having a plurality of substantially cross-shaped fastening holes 51, with each fastening hole 51 having an elongated through hole 611 vertically disposed through each mounting plate 5 and an elongated groove 512 transversely disposed at the bottom of the through hole 511. A plurality of fastening devices vices which include an arrow-shaped plug pin 52, a spring 53 and a washer 54, are respectively fastened into the fastening holes 51 to hold down a master board 9, wherein the arrow-shaped plug pin 62 is comprised of an elongated rod 522 having a bottom end formed into an arrowhead 521 and a top end coupled with a knob 523; the washer 54 is sleeved on the elongated rod 522; the spring 53 is sleeved on the elongated rod 522 and retained between the washer 54 and the knob 523. By inserting arrowhead 521 of the into a corresponding fastening hole 51 on either master mounting plate 5 along the elongated vertical through hole 511, and then pressing down the arrow shaped plug pin 52 and rotating it through a 90° angle, permitting the wider upper part of the arrowhead 521 to be retained in the elongated groove 512. The master board 9 can thereby be conveniently and quickly fastened to the master board mounting plates 5 without the use of any screws. At the same time, the spring 53 gives a pressure to the master board 9 via the washer 54, in holding down the master board 9 and preventing it from being deformed. By pressing down the arrow-shaped plug pin 52 and rotating it through a 90° angle, the arrow-shaped plug pin 52 can be conveniently removed out of the corresponding fastening hole 51, permitting the master board 9 to be dismantled.

Figure 10:
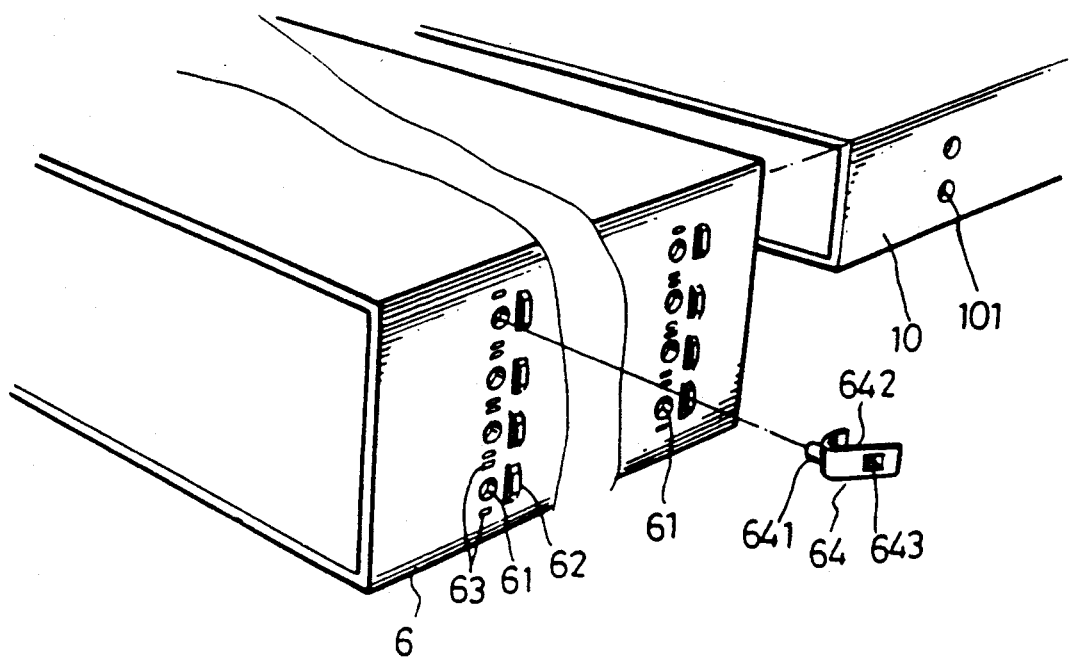
FIG. 10 is an exploded view showing the arrangement of the small round holes, raised holes and raised portions on the main disk drive case and the structure of the fastening device which is used to fasten a disk drive to the main disk drive case.
Figure 11:
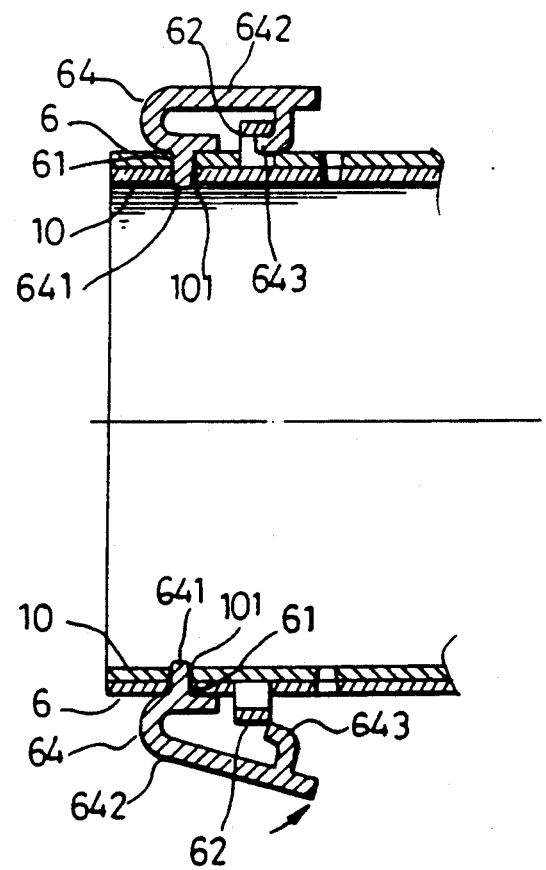
FIG. 11 is a sectional view showing the process of fastening device which is used to fasten a disk drive, and the process in releasing the disk drive.

Referring to FIGS. 10 and 11, the main disk drive case 6 has rows of small round holes 61 on the two opposite side walls thereof corresponding to the bolt holes 101 on the disk drive 10 to be fastened, rows of adjacent holes 62 arranged on the two opposite side walls thereof by the small round holes 61, and pairs of raised portions 63 respectively in line with each row of small round holes 61, wherein a small round hole 61 is surrounded by each pair of raised portions 63. There are provided a plurality of fastening devices 64 used in fastening a disk drive 10 to the main disk drive case 6. Each fastening device 64 is comprised of a J-shaped spring plate 642 having a stub rod 641 at a right angle near the hooked rear end thereof and a hook 643 near the straight top end thereof, wherein the size of the stub rod 641 fits any small round hole 61 on the main disk drive case 6. When the stub rod 641 has been inserted in any small round hole 61, the hook 643 is hooked in the adjacent hole 62. During the assembly process, the disk drive 10 to be fastened is inserted into the main disk drive case 6 with the bolt holes 101 thereof respectively aligned with the small round holes 61 on the main disk drive case 6, the stub rods 641 of the fastening devices 64 are respectively inserted through the small round holes 61 into the bolt holes 101 with the two opposite side edges of the J- shaped spring plates 642 to be stopped against two adjacent raised portions 63, and then the hooks 643 of the fastening devices 64 are respectively hooked in the corresponding raised holes 62, and therefore the main disk drive 10 becomes firmly retained inside the main disk drive case 6. By pulling the J-shaped spring plates 642 outwards to release the hooks 643 from the raised holes 62 the stub rods 641 of the fastening devices 64 are respectively disconnected from the main disk drive 10 and the main disk drive case 6, and therefore the main disk drive 10 can be conveniently removed from the main disk drive case 6.

As indicated, the present invention is to provide a computer mainframe housing which is delicate in design and simple in structure, and which can be conveniently set up without the use of any screws, and then easily dismantled. Furthermore, the present invention can be alternatively arranged into either a horizontal form or a vertical form as desired. Therefore, the present invention is practical in use. Because the structural and functional features disclosed in the aforesaid specification are not known or used by others or described in any printed publication, the present invention provides a useful improvement.

What is claimed is:

1. A computer mainframe housing comprising:
   a back panel,
   two identical cover panels with one for the top and the other for the bottom,
   two identical side panels with one for the left and the other for the right,
   a partition board,
   a plurality of master board mounting plates,
   a main disk drive case having a square front face,
   an auxiliary disk drive case, and
   a front panel connected with said two cover panels and one of said two side panels, said front panel having a square window with a square control panel detachably mounted thereon, said front panel, said two cover panels and the other of said two side panels defining a square hole, said square front face of said main disk drive case being mounted in said square hole.

2. The computer mainframe housing according to claim 1, wherein said master board mounting plates are made from a plastic material, each having a plurality of substantially cross-shaped fastening holes, said cross-shaped fastening holes each having an elongated through hole extending vertically through each mounting plate and an elongated groove transversely disposed on a bottom edge thereof, said cross-shaped fastening holes being respectively inserted with a fastening device to hold down a master board, said fastening device including an arrow-shaped plug pin, a spring and a washer.

3. The computer mainframe housing according to claim 2, wherein said arrow-shaped plug pin is comprised of an elongated rod having a bottom end formed into an arrowhead and a top end coupled with a knob.

4. The computer mainframe housing according to claim 1, wherein said main disk drive case comprises a plurality of rows of small round holes on two opposite side walls thereof corresponding to a plurality of rows of bolt holes on the disk drive to be fastened, a plurality of rows of adjacent holes respectively disposed adjacent to said rows of small round holes by one side, and a plurality of rows of pairs of raised portions alternatively respectively arranged in line with said rows of small round holes, each pair of raised portions including one formed at a location above one small round hole and the other formed at a location therebelow, said small round holes being each fastened with a fastening device to hold the disk drive in place.

5. The computer mainframe housing according to claim 4, wherein said fastening device is comprised of a J-shaped spring plate having a stub rob extending at a right angle near a hooked rear end thereof and a hook near a straight top end thereof, said stub rod being tightly inserted through either round hole into the corresponding bolt hole on the disk drive to be fastened, with said hook hooked in the adjacent hole permitting said J-shaped spring plate to be squeezed in between two adjacent raised portions.

* * * * *